United States Patent [19]

Davis

[11] 4,326,910

[45] Apr. 27, 1982

[54] TRANSFER APPARATUS AND METHOD

[76] Inventor: Jesse B. Davis, P.O. Box 588, 8 Sagamore Hill Dr., Port Washington, N.Y. 11050

[21] Appl. No.: 190,328

[22] Filed: Sep. 24, 1980

[51] Int. Cl.[3] ........................... B65C 9/25; C09J 5/00; B30B 5/02; B32B 31/00

[52] U.S. Cl. .................................... 156/540; 156/238; 156/322; 156/309.9; 156/543; 156/583.5

[58] Field of Search ............ 156/541, 540, 542, 583.5, 156/238, 241, 321, 320, 322, 309.9, 231, 230, 553, 584, 234, 543; 427/314

[56] References Cited

U.S. PATENT DOCUMENTS

| | | | |
|---|---|---|---|
| 3,183,137 | 5/1965 | Harmon et al. | 156/322 |
| 3,458,376 | 7/1969 | Malik | 156/241 |
| 4,124,428 | 11/1978 | Forrest | 156/322 |
| 4,132,581 | 1/1979 | Swartz | 156/322 |
| 4,171,395 | 11/1979 | Tillotson | 156/322 |

*Primary Examiner*—Edward C. Kimlin
*Assistant Examiner*—L. Falasco
*Attorney, Agent, or Firm*—Robert B. Burns

[57] ABSTRACT

Apparatus for transferring a layer of a decorative material from a foil, onto a work piece surface. Said apparatus includes means for accurately metering the necessary degree of heat to the work piece, to achieve the transfer. The heating means include a thermal belt that is sequentially heated and applied to the work piece surface. The temperature of the thermal belt is accurately modulated through at least a pair of rotatable guide rollers which retain and position the belt. The method includes the steps of contacting the work piece and/or the transfer material, with the thermal belt for a sufficient time period to achieve the desired level of heating at the work piece surface.

12 Claims, 2 Drawing Figures

TRANSFER APPARATUS AND METHOD

BACKGROUND OF THE INVENTION

In many industrial applications which relate to the thermal treatment of a work piece it is desirous to preheat the work piece prior to the latter being further worked on. One specific instance of such preheating is exemplified by a hot stamping or roll coating process.

In both instances, a continuous, or discrete decorative coating material is applied to the surface of a work piece. To achieve a successful transfer operation, however, the work piece, as well as a layer of decorative material to be transferred, are both heated. Concurrently, the transfer layer is applied to the work surface under sufficient pressure to assure a firm transfer.

In a specific example, a thin decorative layer of coating material is applied to a metal, wood, plastic or other type of surface. The coating layer is usually embodied in a composite foil.

A characteristic foil which is frequently used in the above process consists primarily of a thin, plastic carrier film or material, normally polyester or the like. One surface of the carrier film is provided with a heat sensitive release agent.

A protective layer or coating is next applied to the heat sensitive release agent. Thereafter one or more layers of the decorative materials are applied, usually by vapor deposition. These layers can consist of a metal such as aluminum, chromium or the like. They could also comprise solid pigments or multi-colored designs.

The decorative layer or layers are next covered with a thickness of a sizing coating comprising a heat sensitive adhesive. This latter serves to bond the one or more decorative coats to the product surface being treated.

It is understood that many different effects can be produced through the proper combination of colors, metals and the like. In any instance, the decorative layers will be adhered or bonded to the treated work surface whereby to give the latter a desired appearance such as that of wood grain, a decal, or other decorative representation.

In the prior art, the technique of transferring a design layer of material onto a work piece usually involves the concurrent application of heat and pressure. For example, in the art of hot stamping and roll coating, heat and pressure are applied to firmly compress the foil element into engagement with the work piece surface.

Transfer of the decorative material from the foil is achieved by first separating the decorative layer through the expedient of melting a thermally degradable adhesive that holds the layer to a carrier material. The released layer, still under pressure, is now pressed onto the work piece surface to which it adheres.

As presently practiced, transfer of a decorative layer in the manner described has generally embodied the application of heat and pressure to a relatively limited area. Usually, both factors have been applied by way of a heated roller which firmly urges the foil into engagement with the work piece.

The pressure roll or roller is normally provided with a resilient surface to best achieve pressure distribution across the work piece surface. Nonetheless, such an arrangement serves to concentrate the applying effort to the work piece through a substantially line contact with the roller.

As a consequence, the work piece is advanced through the transfer step at a relatively slow rate of speed. The low speed is necessitated in order that the actual dwell period at the transfer point will be sufficient to allow enough heat to flow into the foil and thence to the work piece surface.

This lengthy dwell time is mandated to assure the quality of the transfer and as a result the roller or applicator unit is heated to an excessive temperature. Thus, the overall heat provided to achieve the transfer is far in excess of the actual btu requirement. The excess heat at the roller is thereafter dissipated without achieving any useful function.

It is understandable then, that heat losses present factors which normally increase operating costs. Further, the higher roller temperature represents a factor which accelerates equipment useful life.

In the instance of a hot stamping operation, transfer of the decorative layer is achieved by the application of heat and pressure through a stamping pad or element. The latter is essentially heated to a temperature sufficient to cause separation as noted herein, of the decorative layer from the carrier material.

Thus, the stamping head or die is heated to a sufficient temperature to achieve the necessary melting and transfer steps. Practically, the stamping pressure and the heat are applied while the work piece is held stationary beneath the head, the foil being compressed therebetween. Although the transfer operation can be achieved, it is clear that the expenditure of heat as well as dwell time, are excessive.

Toward overcoming the above noted problems, the present apparatus provides a means for achieving a more judicious application of heat to a work piece during a roll coating or hot stamping operation. Physically, the apparatus provides means for increasing the actual dwell time of a heating element against the surface of a work piece. Concurrently, it provides means for more rapidly advancing a work piece to realize an overall increased production rate.

The dwell time of the heating element on the work piece as herein disclosed, is achieved through use of a heated, continuous thermal belt which contacts the work piece at a preheat station. The transfer station is thus extended substantially from a limited or line contact area, to an elongated contact surface moving in the direction of the work piece travel.

Means is therefore provided for accurately and judiciously metering heat to a work piece, as well as to a transfer foil. Said heating means is embodied in a continuous thermal belt which is sequentially guided into heat exchange relation with a heat source, and thence with the transfer member.

The continuous thermal belt is carried on a belt guide system comprised of at least two, and preferably a plurality of driven rollers. The latter are journalled, and so arranged to maintain the belt in a condition of tension throughout a closed circuit. A heat source is positioned sufficiently near to a portion of the belt's closed circuit to permit the belt to be controllably heated as it passes close to or contiguous with the heat source.

To maintain a desired heat level at the transfer station, one or more of the driven belt guide rollers can be provided with a supplemental heating source. The latter can conveniently embody a heater element and either electricity, steam or other form of acceptable energy source compatible with the roller shape.

To best assure the desired decorative layer transfer, the work piece is preferably preheated by the moving thermal belt through physical contact with the belt. This heat exchange is initiated prior to contact between the work piece and the foil member. Thus, the work piece which is normally of a much greater thickness than is the foil, can conduct either the major part of the heat required by the latter, or at least a portion of the heat requirement.

Stated otherwise, what applicant has provided is means for metering an accurately determined amount of heat to a work piece and to a transfer foil, whereby to best accomplish a transfer of the decorative layer from the latter onto the work piece. Further, by controllably regulating the dwell time between transfer foil and work piece, it is possible to greatly decrease the overall operation time, and to decrease the per unit cost.

It is an object of the invention therefore to provide an improved apparatus and method for achieving a more rapid and efficient transfer of a decorative layer to the receiving surface of a work piece. A further object is to provide an apparatus capable of more effectively delivering a controlled flow of heat to a work piece. A still further object is to provide a novel heat transfer apparatus capable of more efficiently regulating the heat flow required to achieve a heat transfer operation onto a work piece.

DESCRIPTION OF THE DRAWINGS

FIG. 1 illustrates an apparatus of the type contemplated which embodies a frame 10 upon which the respective component parts are cooperatively mounted. A closed conveyor belt or chain 11 is mounted to a series of guide sprockets 12 and 13 and rollers, extending across the frame forward face. Said chain 11 is provided with a series of spaced apart holders 14 which are adapted to removably position a work piece 16, the exposed receiving surface 17 of which is to be treated.

Figure 1:
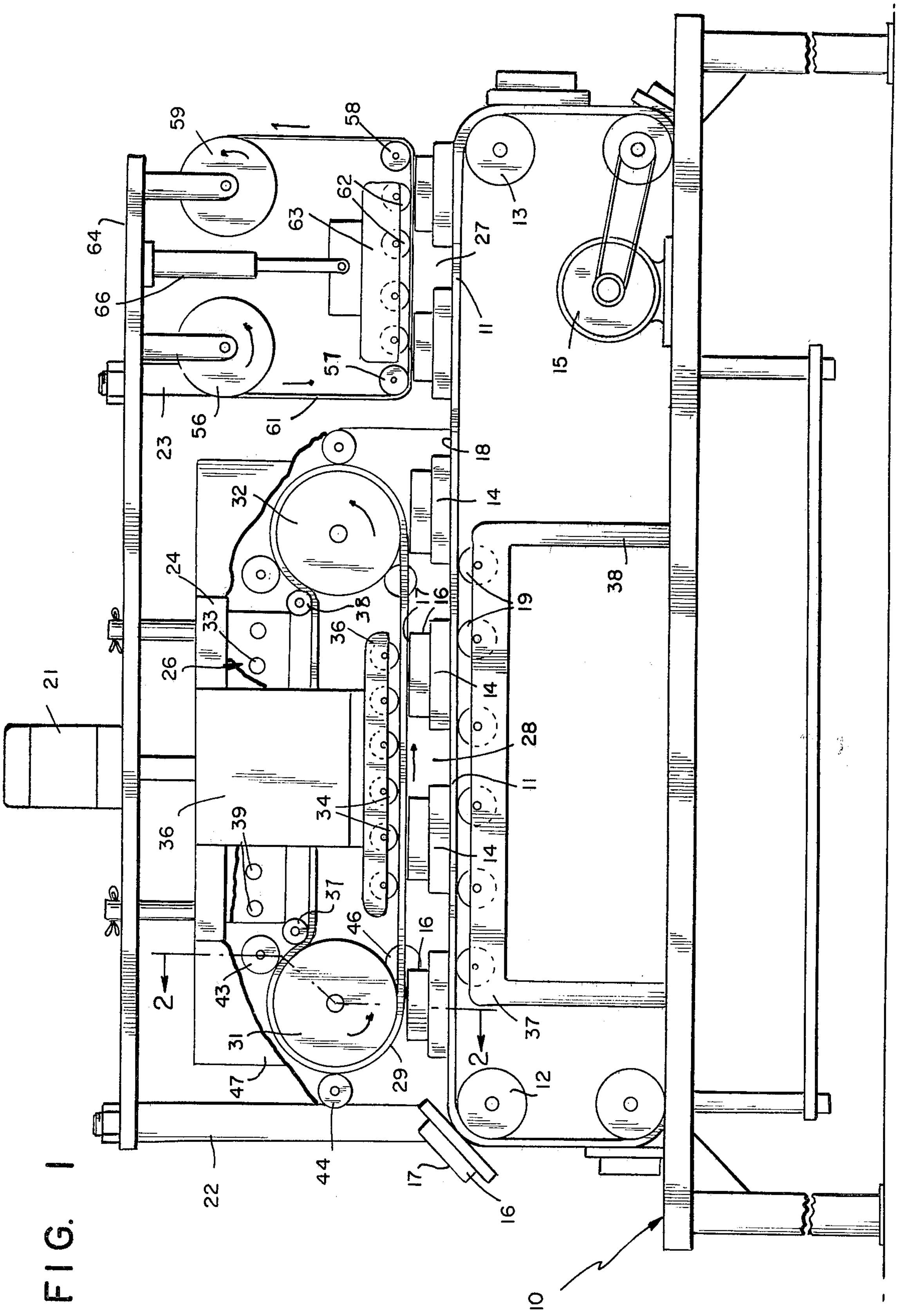
FIG. 1 is an elevation view of the apparatus with parts shown broken away to view the interior.

The chain's upper tier is guided in a generally horizontal disposition across the apparatus to facilitate manual or automatic loading and unloading of the respective work pieces into holders 16. A series of support rollers 19 are arranged to back up conveyor chain 12 as the transfer force or pressure is applied to the upper side thereof.

Operationally, work pieces 16 are removably fixed onto conveyor 12 at the apparatus loading end. The driven conveyor then carries each work piece through a preheat period, to a transfer station 27. At the latter, the decorative layer is applied to the work piece receiving surface 17.

A plurality of columns 22 and 23 depending uprightly from the machine bed operably guide a movable platen or platform 24 to which a heater unit 26 is affixed. Platen 24 is connected to an air cylinder 21, toggle mechanism or the like, which controls the platen's vertical disposition.

The primary preheating section of the apparatus is defined by thermal travelling belt 29 which is sequentially guided through a heat source or heater 26, and thence into heat exchange contact with the moving work pieces 16. The heat metering or heat exchange apparatus includes at least two main guide rollers 31 and 32 which are spaced apart, and journalled immediately above work piece chain conveyor 12.

Heater unit 26 is operably positioned intermediate main guide rollers 31 and 32. Said heat unit 26 includes a casing 33 which is connected to platen 24 such that the casing can be controllably lowered into convenient heat exchange range of thermal belt 29.

Thermal belt 29 as shown, is carried on main belt guide rollers 31 and 32 such that the lower part of the closed loop defined by the belt, passes beneath an array of compression members 34, or alternately a pressure applicator plate.

The array of compression rollers 34 is so positioned to urge the heated section of belt 29 into close contact with the receiving surface of moving work pieces 16. Rollers 34 are thus journalled to vertical bracket 36. Said rollers 34 are preferably formed of a smooth surfaced reinforced ceramic or other suitable heat resistant material, due to their constant engagement with the heated belt surface.

Drive means is connected to the rear side of one or more of main rollers 31 and 32. Although not presently shown, said drive means propels thermal belt 29 along its closed path in a controlled manner to coordinate its rate of travel with the conveyor chain 12 rate of travel.

Heater unit 26 includes a plurality of spaced apart heater elements 39. The latter can take any of several forms including electric resistance type, steam, infrared or other. In any instance, heating elements 39 are mounted transversely of the open bottom casing 33. The latter can be provided with adjustable reflectors and/or heat deflectors as required to permit modulation of the amount of heat generated for a particular condition.

Heater casing 33 is provided with at least two spaced apart leveler members 37 and 38 in the form preferably of journalled rollers. The latter depend downwardly from casing 33 lateral side and function to contact the face of the thermal belt 29. The rollers thus accurately space the belt surface from heater 26 to best utilize the heat generated in the latter. As heater 26 is lowered into place against belt 29, it will also apply a tensioning force to the guide belt, as well as spacing the latter a sufficient distance from the heater elements 39 to most effectively use available radiation.

When conveyor chain 12 and thermal belt 29 are in operation, heater 26 will be maintained in a depressed or down position by platen 24. Thermal belt 29 will thus be forced into a condition of tension and will be driven along its path by contact with the one or more main rollers 31 and 32. Either of the latter, as mentioned, can be provided with a suitable automatic or manually operated variable drive mechanism.

In the down or operating position, the heated thermal belt 29 will contact the first work pieces 17 and proceed concurrently therewith across the machine front through the preheat section. When, however, heater 26 is adjusted to the raised position, thermal belt 28 will be relaxed and will no longer be driven. Along with the raising of heater 26, power to the latter can be automatically discontinued such that no heat will be generated when conveyor belt 12 is not in motion.

Figure 2:
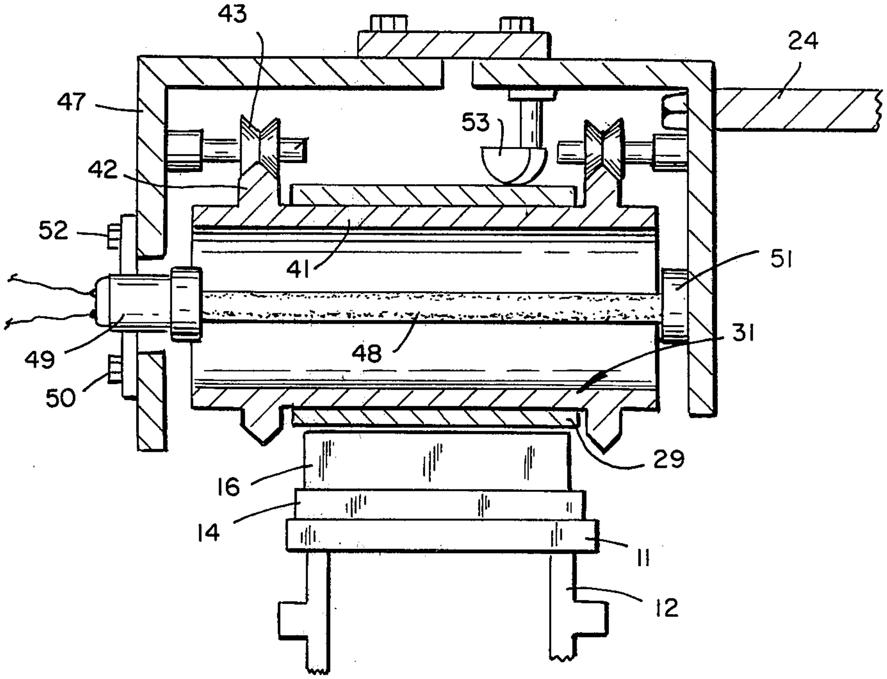
FIG. 2 is a cross-sectional view taken along line 2—2 of FIG. 1.

Referring to FIG. 2, one embodiment of the main drive rolls 31 and 32 is shown, which propels thermal belt 29. Roller 31, for example, comprises an elongated tubular body or core member 41 preferably formed of a metal such as aluminum or steel. Each end of the roller is provided with a support ring or track 42 spaced a convenient distance inward from the roller edge.

Support track 42 depending upwardly from the periphery of body 41, is characterized in the present embodiment by a "V" configuration. Roller 31 is maintained rotatably in position by a plurality of bearings 43, 44 and 46. The latter are in turn mounted to a common bearing support plate 47.

Each bearing includes a peripheral surface which rollably engages and conforms to track 42 surface. The bearings thus not only radially support the roller, they also position it laterally. Tracks 31 and 32 are spaced sufficiently apart to accommodate belt 29 therebetween as roller 31 is rotated to guide and/or drive the belt.

Bearing support plate 47 as shown, includes an upright member which depends from platen 24. The plurality of bearings 43, 44 and 46 are mounted in a manner to be inwardly movable, such that roller 31 will be radially and laterally supported by at least three bearings, any or all of which can be adjusted as needed. Bearings 43, 44 and 46 depend outwardly from the bearing bracket 47, being preferably equispaced about a point concentric with the main roller 31.

Bearing mounting bracket 47 is adjustable to permit accurate alignment of the "V" grooved bearing surface so that the latter can be properly aligned with the corresponding support track 42.

Referring to FIG. 2, at least one, and optionally both main rollers 31 and 32 can be provided with supplemental heating means which will function in conjunction with the main heater unit 26. Thus, main roller 31 is provided with an inwardly extending electrical heating element 48 having the connecting terminal 49 at one end extending through an opening in bearing bracket 47, and being fastened to the latter by bolts 52, as remote receptacle 51, supportably engages the heater 48 inner end. Thus, electrical element 48 is removably from roller 31 in the event the heater becomes damaged or burned out.

Replacement of heater element 48 is achieved merely by loosening mounting bolts 52 and sliding the heater bracket horizontally until the inwardly protruding electrical element 48 clears roller 31 and can thereby be replaced. Electrical connections to heater element 48 are engaged with the end of the latter and can be readily disconnected before any adjustments are made. In a similar manner, steam or other power connections could be readily made to a steam or other form of heater.

The changing of heater 48 in the event of unexpected damage or ordinary wear is effectuated rapidly without an undue lengthy interruption of the machine's operation. This form of supplemental, controlled heating is provided when the heat to the belt as applied by heater 26, is insufficient to bring the belt to an adequate temperature to achieve a desired operation. The supplemental heater unit can therefore be actuated in response to the temperature of thermal belt 29 as the latter leaves the heater 26 and prior to contacting work pieces 17. This assures a greater degree of accuracy in maintaining the belt within a narrow desired temperature range.

Toward controlling this secondary or supplementary heating, thermal belt 29 can be provided with a thermal sensor means 53 which is disposed to contact the belt surface at a point prior to its engaging work pieces 16. Sensor means 53 will thus establish a signal responsive to the temperature of the belt surface. The sensor is further connected to an electrical power source to actuate or regulate current flow to the heater within the desired temperature range.

Referring to FIG. 1, after work pieces 16 are brought to a desired temperature in the apparatus preheating section, the work pieces separate from contact with thermal belt 29 and are carried into the transfer station section 27.

The latter comprises essentially a supply of foil 61 which is wound on a first reel 56, and is progressed by way of a pair of guide rollers 57 and 58, through the transfer station. Downstream of the latter, the foil carrier, having had the decorating layer removed, is rewound onto a take-up reel 59.

An array of closely spaced pressure rollers 62 are journalled on one or more roller brackets 63, which in turn depends from upper plate 64. An air cylinder 66, or similar adjustable means, permits bracket 63 to be vertically adjusted, and consequently to exert downward pressure against foil 61 within transfer station 27.

Foil 61 is guidably led into transfer station 27 by way of the first guide roller 57; thus, the foil will contact the preheated surface 17 of the work piece 16. In such condition the foil release agent will be melted, and the decorative leaf layer released from the carrier.

To effectuate transfer of the decorative layer onto the work piece 17 surface, pressure applied by air cylinder 66 exerts a downward force against the foil exposed side. Said pressure member, as noted, includes bracket 63 which supports closely spaced pressure rolls 62. Horizontal spacing of rollers 62 assures a virtually constant downward force against the work piece heated surface 17.

As each work piece 16 leaves transfer station 27 it will have the design layer permanently adhered to at least one surface thereof. The stripped, or partially stripped carrier member of the foil is concurrently now wrapped onto take-up roll 59. Drive means connected to reel 59 can be regulated to coordinate foil movement with forward movement of work pieces 16.

It is seen that actual transfer of the decorative layer onto the work piece 16 is a function of the heat which is applied at the preheating section, in combination with the time period during which pressure is applied at transfer station 27. In either instance, one or both factors of heat and roller pressure can be readily adjusted. Further, the speed of the conveyor 11 can be adjusted, preferably to speed up passage of the respective work pieces 16 through the two stations for the sequential preheating and transferring of the decorative layer.

It is clear that with this form of control over the application of heat to work pieces 16, the speed of work piece travel, as well as the overall transfer operation, can be greatly increased.

Other modifications and variations of the invention as hereinbefore set forth can be made without departing from the spirit and scope thereof, and therefore, only such limitations should be imposed as are indicated in the appended claims.

I claim:

1. In an apparatus for controllably preheating the receiving surface of a work piece by conducting the latter through a pretreating station, and prior to adhering a layer of material from said apparatus including;

a belt guide system having a plurality of spaced apart guide rollers 31 and 32, a thermal belt 29 carried on said belt guide system and defining a closed belt circuit around said guide rollers 31 and 32, a heat source disposed adjacent to a segment of said closed belt circuit for controllably raising the belt temperature along said segment, and drive means engaging said belt guide system and being operable to progress the belt heated segment from said heat source, to said pretreating station, whereby to contact said work piece at said pretreating station, a conveyor chain operably guided to pass continuously adjacent to a heated portion of said thermal belt, said chain being adapted to carry at least one work piece in a manner that the receiving surface of the latter is disposed in heat exchange contact with the thermal belt, a transfer station positioned adjacent to said preheat station and arranged coextensively with said conveyor chain and including;

a plurality of pressure rollers, means holding a supply of foil having a thermally transferable decorative layer thereon, a thickness of said foil being registered intermediate a work piece heated surface, and said plurality of pressure rollers, whereby the thermally transferable foil layer will be urged against the work piece heated surface to cause transfer of the said layer onto said work piece surface without interrupting movement of the conveyor chain.

2. In the apparatus as defined in claim 1, wherein said belt guide system includes;

at least two elongated cylindrical rollers 31, 32 having opposed ends, a peripheral support track 42 disposed adjacent to each of said cylindrical roller ends, and defining a belt drive and belt guide section therebetween, a plurality of bearing members 43, 44, 46 positioned outward of said support track and in rolling engagement with the latter.

3. In the apparatus as defined in claim 1, including; heat sensor means disposed adjacent to said belt circuit and being operable to regulate the belt heating rate at said heat source.

4. In an apparatus as defined in claim 1, including; belt tensioning means disposed in rolling engagement with said belt guide system.

5. In an apparatus as defined in claim 2, wherein said peripheral support track and said bearing members are in rolling engagement at a peripheral "V" joint.

6. In an apparatus as defined in claim 2, including; a supplementary heat source disposed internally of at least one of said elongated cylindrical rollers.

7. In an apparatus as defined in claim 6, wherein the supplementary heat source comprises a heating element extending longitudinally of and spaced from said elongated cylindrical roller, and communicated with a heater actuating medium.

8. In an apparatus as defined in claim 2, wherein; at least one of said plurality of bearing members 43, 44, 46 is operably mounted to permit displacement thereof from engagement with said support track 42.

9. In an apparatus as defined in claim 1, wherein said guide roller comprises; a non-metallic, heat conducting tube.

10. In an apparatus as defined in claim 7, wherein; said supplementary heat source is electrically powered.

11. In an apparatus as defined in claim 7, wherein said supplementary heat source is fluid actuated.

12. In an apparatus as defined in claim 7, wherein said supplementary heat source comprises; an infrared radiating member.

* * * * *